(12) United States Patent
Pottmann

(10) Patent No.: US 8,042,680 B2
(45) Date of Patent: Oct. 25, 2011

(54) RELEASABLE COUPLING

(75) Inventor: Manfred Pottmann, Remscheid (DE)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 12/488,708

(22) Filed: Jun. 22, 2009

(65) Prior Publication Data

US 2010/0032264 A1  Feb. 11, 2010

Related U.S. Application Data

(63) Continuation of application No. PCT/EP2007/064341, filed on Dec. 20, 2007.

(30) Foreign Application Priority Data

Dec. 22, 2006 (DE) .................. 10 2006 062 240

(51) Int. Cl.
*B65G 33/26* (2006.01)
(52) U.S. Cl. ......... 198/677; 198/674; 366/38; 366/76.3; 366/157.1
(58) Field of Classification Search ............... 198/674, 198/675, 677; 366/20, 35, 38, 76.1, 76.3, 366/76.4, 133, 157.1
See application file for complete search history.

(56) References Cited

U.S. PATENT DOCUMENTS

| | | | | |
|---|---|---|---|---|
| 2,620,173 A | * | 12/1952 | White ........................ | 366/157.1 |
| 2,626,788 A | * | 1/1953 | Ragland ..................... | 366/157.1 |
| 2,633,170 A | * | 3/1953 | Balmain ..................... | 99/494 |
| 3,353,270 A | * | 11/1967 | Simon ........................ | 99/459 |
| 3,592,444 A | * | 7/1971 | Arvanitakis ............... | 366/153.1 |
| 4,078,653 A | * | 3/1978 | Suter ........................... | 198/625 |
| 4,527,899 A | * | 7/1985 | Blach et al. ................ | 366/79 |
| 4,774,848 A | * | 10/1988 | Zupancic ................... | 74/425 |
| 4,781,487 A | | 11/1988 | Greco | |
| 4,911,558 A | * | 3/1990 | Teske ......................... | 366/300 |
| 5,004,095 A | * | 4/1991 | Lapeyre et al. ............ | 198/660 |
| 5,033,608 A | * | 7/1991 | Lorimor et al. ............ | 198/674 |

(Continued)

FOREIGN PATENT DOCUMENTS

CN  2050604 U  1/1990

(Continued)

OTHER PUBLICATIONS

International Preliminary Report on Patentability; PCT/EP2007/064341; Oct. 22, 2008; 14 pages.

(Continued)

*Primary Examiner* — Joseph A Dillon, Jr.
(74) *Attorney, Agent, or Firm* — St. Onge Steward Johnston & Reens LLC

(57) ABSTRACT

A releasable coupling, including a first and a second coupling part for transmitting torque, where the first coupling part has a projection which extends in the direction of the geometrical axis of rotation and in the circumferential surface of which a first peripheral groove is embedded, that the second coupling part has a recess which is matched in cross section to a receptacle on the projection and in the circumferential surface of which a second peripheral groove is embedded, that an annular securing element is provided, the securing element being elastically deformable with respect to the contour of its open or closed periphery and, in the separated state of the two coupling parts, being insertable into one or optionally into one of the peripheral grooves and the contour of which, in the separated state of the two coupling parts, projecting out of the peripheral groove.

18 Claims, 7 Drawing Sheets

U.S. PATENT DOCUMENTS

| | | | | |
|---|---|---|---|---|
| 5,167,320 A | * | 12/1992 | Lucich et al. | 198/675 |
| 5,253,746 A | * | 10/1993 | Friesen et al. | 198/550.2 |
| 5,328,015 A | * | 7/1994 | Volk et al. | 198/548 |
| 5,564,329 A | * | 10/1996 | Tomimatsu | 99/334 |
| 5,667,332 A | | 9/1997 | Lindholm | |
| 5,673,618 A | * | 10/1997 | Little | 100/145 |
| 6,151,810 A | | 11/2000 | Mukai | |
| 6,280,074 B1 | * | 8/2001 | Kuroda et al. | 366/76.3 |
| 6,508,581 B2 | * | 1/2003 | Florian | 366/76.1 |
| 6,582,151 B2 | * | 6/2003 | Hopson | 403/359.5 |
| 6,719,448 B2 | * | 4/2004 | Tedman et al. | 366/76.3 |
| 7,516,838 B2 | * | 4/2009 | Dutschke | 198/677 |
| 2002/0090257 A1 | | 7/2002 | Hopson | |

FOREIGN PATENT DOCUMENTS

| | | |
|---|---|---|
| DE | 3016944 A1 | 11/1981 |
| DE | 4207839 A1 | 9/1993 |
| DE | 29501158 U1 | 3/1995 |
| DE | 4429256 A1 | 2/1996 |
| WO | 8803269 A2 | 5/1988 |

OTHER PUBLICATIONS

International Search Report & Written Opinion of the International Searching Authority; PCT/EP2007/064341; Apr. 14, 2008; 8 pages.

Chinese Office Action; Application No. 200780051469.6; Sep. 10, 2010; 5 pages.

German Office Action; Application No. 07 857 961.2-1252; Dec. 18, 2009; 4 pages.

German Office Action; Application No. 10 2006 062 240.5; Sep. 18, 2007; 4 pages.

* cited by examiner

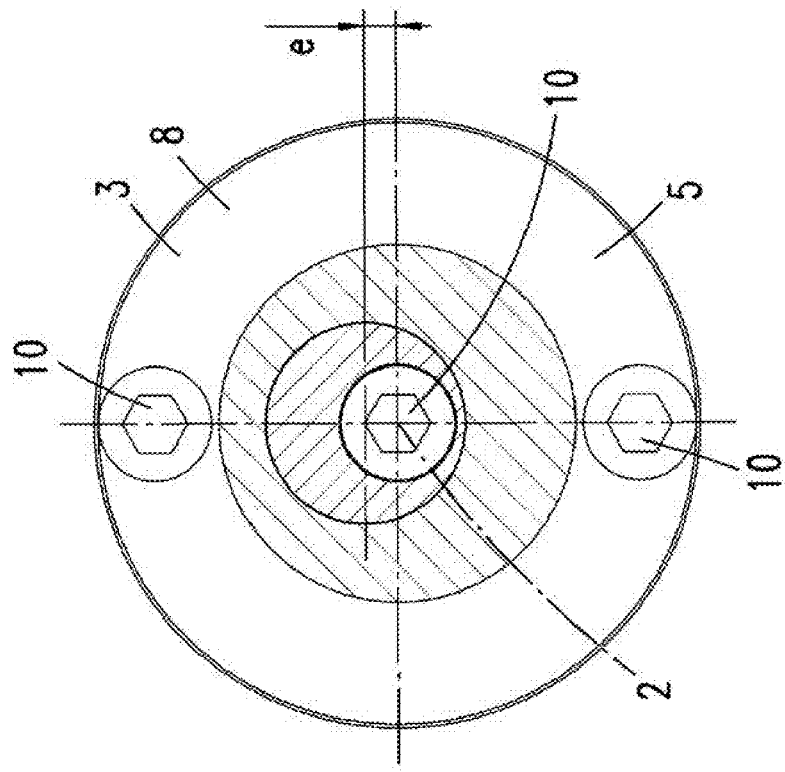

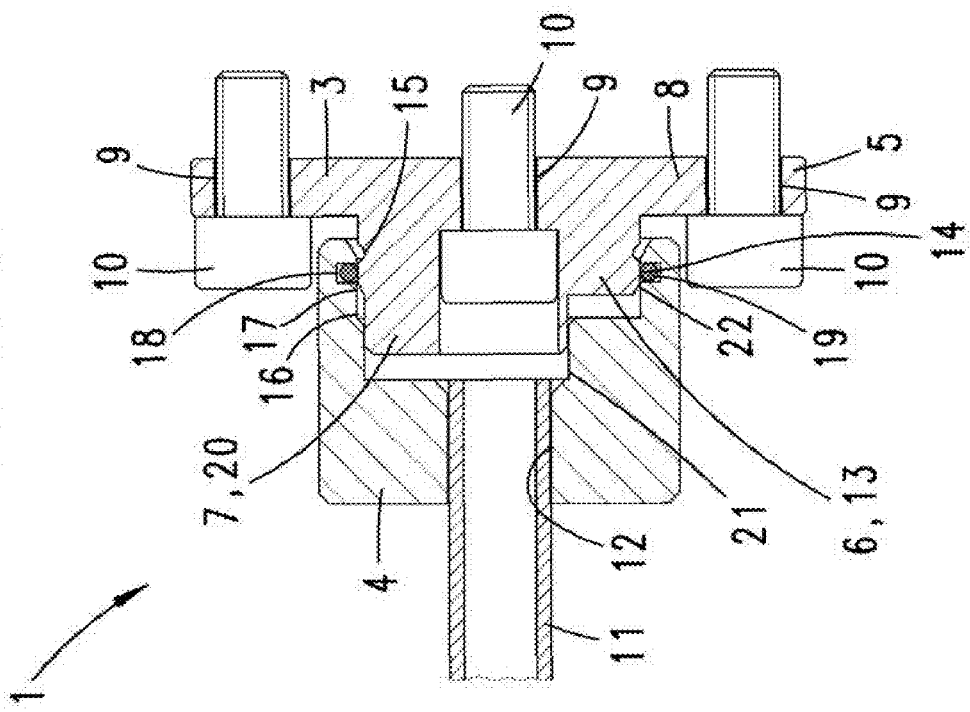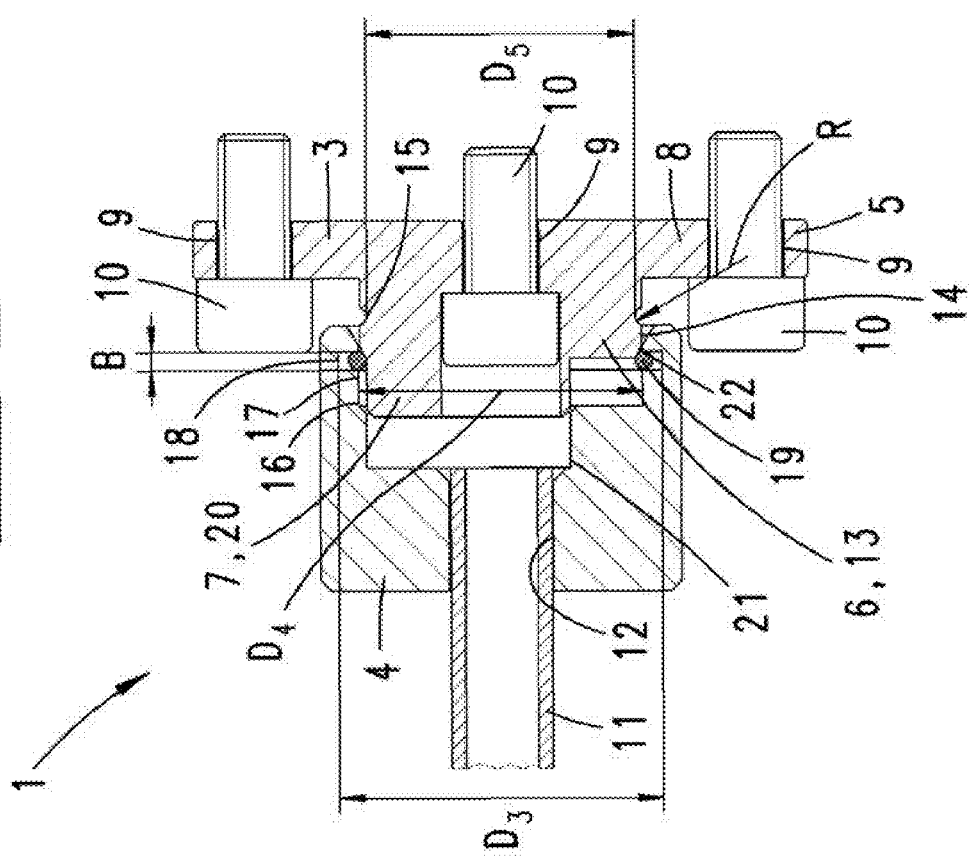

RELEASABLE COUPLING

CROSS-REFERENCE TO RELATED APPLICATIONS

The present application is a continuation of pending International patent application PCT/EP2007/064341 filed on Dec. 20, 2007 which designates the United States and claims priority from German patent application 10 2006 062 240.5 filed on Dec. 22, 2006.

FIELD OF THE INVENTION

The present invention relates to a releasable coupling, preferably for releasable coupling connection of drive and output elements such as shaft ends, comprising a first and a second coupling part with means for transmitting torque.

BACKGROUND OF THE INVENTION

A large number of couplings of this kind of different designs are known. However, if said couplings are couplings which can be connected with a view to being released, complex additional devices are sometimes required for the engagement and disengagement procedures. Secondly, that is to say if the couplings are permanently closed couplings, establishing and releasing the coupling connection is often only possible by way of an assembly/disassembly procedure. Known in particular are couplings of which the two coupling parts have to be screwed to one another in order to transmit torque. This is only possible when, depending on the installation position of the coupling, there is sufficient installation space and an adequate degree of accessibility, but this is not always the case in the desired manner and/or leads to structural constraints. Furthermore, such assembly (disassembly) often also takes an undesirable amount of time.

Against this background, it is an object of the invention to develop the coupling cited in the introductory part in a manner which is advantageous for use, so that in particular the abovementioned disadvantages may be avoided as far as possible.

SUMMARY OF THE INVENTION

According to the invention, the object is solved first and foremost in conjunction with the features that the first coupling part has a projection which extends in the direction of the geometric axis of rotation (that is to say the rotation axis or longitudinal axis of the coupling) and in the lateral surface of which a first peripheral groove, in particular an annular groove, is formed, that the second coupling part has a recess, the cross-section of which is adapted as a receptacle for the projection and in the lateral surface of which a second peripheral groove, in particular an annular groove, is formed, that a ring-like locking member is provided, which is elastically deformable in terms of the contour of its open or closed periphery, it being possible to insert said locking member into a peripheral groove or selectively into one of the two peripheral grooves when the coupling parts are in the disconnected state, and the contour of said locking member protruding out of this peripheral groove when the two coupling parts are in the disconnected state. It is especially preferred that, in the state in which the two coupling parts are disconnected, the locking member takes up, in the peripheral groove into which it has been inserted, a shape and/or position such that it automatically or necessarily protrudes in a resiliently flexible manner out of said groove. The coupling parts of a coupling of this type can be connected by the projection being inserted into the recess in the longitudinal direction of the coupling, as a result of which the locking member is deformed in a temporary and resilient manner by means of the other coupling part by virtue of the shaping of this other coupling part, that is to say the locking member is either resiliently expanded or compressed depending on the peripheral groove selected for the insertion of the locking member, after which the locking member, while providing axially aligned orientation of the two peripheral grooves, also automatically engages in the further peripheral groove under the prestress of the locking member. The connection state is accordingly achieved by a simple relative movement of the two coupling parts along their geometric axis of rotation or longitudinal axis, it being possible for a small axial movement space to be sufficient for this purpose. By virtue of the prestressed connecting element snapping into the second peripheral groove, the connection state is automatically locked, so that no tool is required for this purpose. It is possible to release the coupling parts by exerting a force on one or both coupling parts counter to the connecting direction, said force being sufficient to produce a force action on the peripheral groove or grooves for renewed resilient deformation of the locking member with radial movement into only one of the two peripheral grooves. It is therefore possible to release the coupling parts with only minimal space for movement and without tools. In this case, the invention provides the possibility of various configurations in order, in particular by virtue of the shaping and dimensioning of the projection and/or recess and of the two peripheral grooves in accordance with the locking member, to determine how high the two force effects required for connecting and for releasing purposes should be (these can be preferably of different magnitudes) or whether accommodation of the locking member in the peripheral groove of the first or second coupling part is advantageous in the released state.

In terms of shaping and size, the locking member is preferably realised such that it can be inserted into the second or radially outer peripheral groove, and that the inner contour of said locking member protrudes radially inward out of the second peripheral groove into the cross-section of the first recess when the two coupling parts are in the released state, and engages in the first or radially inner peripheral groove when the two coupling parts are in the connected state. As an alternative, it would be possible for the locking member to be insertable into the first peripheral groove and for the outer contour of said locking member to protrude outward from the first peripheral groove when the two coupling parts are in the released state, and to engage in the second peripheral groove also, when the two coupling parts are in the connected state. It is further preferred for the cross-sections of the projection and of the recess to be matched to a common clearance or transition fit and to be bounded in a circular manner, preferably transverse to the geometric axis of rotation or to the longitudinal axis of the coupling. As a result, the projection and the recess can exert a centering effect on the two coupling parts, depending on the configuration. An advantageous configuration can be seen when the locking member used is a round-wire circlip, preferably comprising spring steel, which is open on the periphery. On account of its peripheral opening and the elastic material properties, said round-wire circlip has the desired resiliently flexible peripheral contour, that is to say its diameter or cross-section can be temporarily increased or reduced in size in accordance with the force effect against its resilient restoring force. Furthermore, the round wire-cross-section of such circlips provides advantages for the plug-type coupling according to the invention since it is possible to determine in conjunction with various groove cross-sections of the peripheral, or in particular annular, grooves, the axial force that is to be exerted on the coupling part or the two coupling parts until the desired elastic deformation of the locking member is reached on account of the transmission of force by the first and/or second peripheral, or in particular annular, groove. As an alternative, use may be made of other types of circlips and locking rings and also securing elements of different configuration, in particular also corresponding to the cross-sections of projections and recesses that have a peripheral contour which deviates from the circular line, for example an oval or polygonal or even a non-round or square peripheral contour. In addition, a locking member may be used which has an oval, polygonal or angular cross-sectional shape instead of a round-wire or a circular cross-sectional shape. The material used may be, for example, a plastic, in particular glass- or carbon-fiber-reinforced plastic, or, for example, a bimetal realisation.

A practical configuration can be seen in the first peripheral groove having, transverse to the peripheral direction, that is to say in cross-section, a rounded cross-section, preferably a cross-section which is in the form of a portion of a circle, more preferably a cross-section which is in the form of a semicircle. In this context, it is further preferred for the second peripheral groove to have, transverse to the peripheral direction, an angular cross-section, preferably a rectangular cross-section, more preferably a square cross-section. A cross-section which is in particular rectangular or square, the corners of which are rounded or chamfered, is also possible. The size of the corner radius of the rounded portion can be selected as desired so that the cross-sectional shape approximates to a semicircle or corresponds to a semicircle. When the connected coupling parts are being released, depending on the cross-section and also depending on the depth to which the locking member engages into the two axially aligned peripheral grooves, conversion of the axial disconnection force into a radial force of comparatively greater magnitude is facilitated, by the, preferably radially inner, peripheral groove of rounded cross-section compared to the second peripheral groove, so that the locking member is radially expanded (that is to say is not radially constricted) and moves to the second, preferably radially outer peripheral groove. This may be still further assisted by virtue of the fact that the locking member has, transverse to the peripheral direction, the round cross-section which has already been discussed, of which round cross-section the cross-sectional radius preferably corresponds to or is slightly less than the radius of the rounded portion of the first peripheral groove and/or of which round cross-section the diameter may be approximately equal to or somewhat less than the width of the second peripheral groove. Provision is preferably made for the locking member to be inserted into the second peripheral groove, which is formed in the lateral surface of the recess, before the two coupling parts are connected, so that the inner contour of said locking member initially projects out of the second peripheral groove into the cross-section of the recess. In order to facilitate radial expansion when the two coupling parts are connected, it is possible for the cross-section of the projection to be tapered, preferably tapered in a conical and/or rounded manner, at the edge of the projection which faces the base of the recess when the coupling parts are joined together. The tapered portion, which is for example conical, effects force transmission that facilitates the radial expansion of the locking member, depending on the cone angle, so that only a comparatively low axial force is required for assembling and for connecting the two coupling parts, depending on the specific configuration. Secondly, the level of the axial force which is required to then disconnect the two coupling parts depends on the cross-sectional shapes of the two peripheral grooves and of the locking member. It is preferred for the axial force required to disconnect the coupling parts to be greater in magnitude than the axial connecting force, this being achieved by suitable configuration of the coupling parts and explained in greater detail in the text which follows. Said tapered portion may preferably extend as far as an edge cross-section or edge diameter of the projection, this corresponding approximately to or being slightly smaller than the smallest cross-section or cross-sectional diameter of the projection which is left by the first peripheral groove. In a preferred configuration in which the projection and the recess have a circular cross-section and the periphery of the locking member at least substantially follows a circular contour, provision may be made, in the unloaded state of the locking member, for the outside diameter of said locking member to be less than the diameter of the second peripheral groove at the groove base of said groove, and to be greater than the diameter of the recess. This provides a sufficient gap, in particular an annular gap, in the second peripheral groove, firstly radially outside the locking member, so that the locking member can expand to the necessary degree during the process of connecting the coupling parts. Secondly, the locking member is held in the second peripheral groove in a captive manner as early as after being inserted into said second peripheral groove. It is further preferred that, in the unloaded state of the locking member, the inside diameter of said locking member corresponds to or is slightly greater or less than the diameter of the first peripheral groove at the groove base of said groove. This has the effect that the circlip or locking ring is located in the first peripheral groove without appreciable radial force when no axial force acts on the coupling parts. Secondly, direct transfer of force is achieved in the event of the circlip or ring being accommodated in this way with virtually no radial play. It is also preferred that, at least in the state in which the two coupling parts are connected, the inside diameter of the locking member corresponds to the diameter of the first peripheral groove at the groove base of said groove, and the outside diameter of the locking member is greater than the diameter of the recess. The abovementioned, preferred features have the result that the axial force required to connect the two coupling parts is smaller in magnitude than the axial disconnection force. A plug-type coupling of this type is therefore preferably suitable for applications in which assembly is to be performed in the simplest manner possible and with as little force as possible, but on the other hand the resiliently elastic snap-action connection or locking which serves for connection purposes is to sustain certain axial forces which occur during operation without the connection coming apart. Applications of this type can be found, for example, in the drive of worm conveyors or worm gears, or, for example, also in obliquely toothed gear mechanisms. Even if the above-described cross-sectional shapes and diameters of the first and second peripheral grooves and of the locking member are preferred embodiments, it goes without saying that a wide variety of modifications of these embodiments are also possible within the scope of the invention. For example, it is possible to form the cross-sectional shape of the first peripheral or annular groove to be angular, in particular with rounded portions or chamfers provided in the corners and/or to form the cross-sectional shape of the second peripheral or annular groove to be round.

According to a further aspect, it is also preferred for, on the first coupling part, the projection to extend from a connection end, which is preferably in the form of a disk and can serve for connection to a drive-side or output-side shaft end, with its lateral surface concentric with the geometric axis of rotation, that is to say with the longitudinal or rotational axis of the coupling. As an alternative, extension of the projection, and accordingly also of the recess, parallel to and at a spacing from the said rotational or center axis, that is to say in an eccentric manner, would also be possible. In conjunction with an eccentric recess, which has a matching cross-section, an eccentric projection of the above type also forms an eccentric driver, the positively-locking connection of which can be used to transmit torque. This means that an eccentric projection of this type, in conjunction with an eccentric recess, would be suitable both for releasable axial connection of the coupling parts and also, by performing a double function, for transmitting torque. Torque transmission by means of the projection and the recess, which have the peripheral groves, would also be possible by said projection and said recess being formed centrally in relation to the center axis but in each case having a mutually matching non-round cross-section, for example an oval, polygonal or angular cross-section. If the cross-section of the projection and the recess deviates from a circular shape, the peripheral profile of the peripheral grooves may deviate from a circular line and to this degree be matched to the peripheral profile of the projection and recess in a suitable manner. The ring-like locking member may also be matched to this, that is to say may have, for example, an oval, polygonal or angular peripheral profile in the unloaded state.

However, it is preferred within the scope of the invention for a separate eccentric projection and a separate eccentric recess to be provided for transmitting torque. It is possible for one of the coupling parts to have at least one eccentric projection which extends parallel to and at a spacing from the axis of rotation of the coupling, and for the other coupling part to have at least one eccentric recess for accommodating the eccentric projection, it being possible for the eccentric projection and the eccentric recess to be assigned to the first and second coupling parts in different ways. It is possible for the cross-sections of the eccentric projection and of the eccentric recess to be matched to a common clearance or transition fit as a result of which virtually play-free torque transmission in both directions of rotation is possible. It is also preferred for the two cross-sections of the eccentric projection and the eccentric recess to be bounded in a circular manner, or, for example, in an oval, polygonal or similar manner, transverse to the axis of rotation of the coupling, so that edges are avoided and also high torques can be transmitted without damage. It goes without saying that it is also possible for a plurality of such eccentric projections and a plurality of matching eccentric recesses to be provided for transmitting torque. A possible alternative to a separate eccentric projection and a separate eccentric recess can be seen by there being, for torque transmission, a separate rotary positively-locking projection and a matching rotary positively-locking recess, said rotary positively-locking projection and rotary positively-locking recess having a cross-section which deviates from a circular shape and therefore not necessarily being disposed eccentric to the center axis or rotation axis of the coupling for torque transmission purposes. An oval, polygonal or, under certain circumstances, also an angular cross-section are possible. A preferred configuration can be seen when the eccentric projection or rotary positively-locking projection extends starting from the tapered edge of the, in particular concentric, projection which has the first peripheral groove, and the eccentric recess or rotary positively-locking recess extends starting from the base of the, in particular concentric, recess which has the second peripheral groove. As a result, the snap-action connection or locking is first produced when the eccentric projection or rotary positively-locking projection enters the eccentric recess or rotary positively-locking recess. The first and the second coupling part may be matched to flanges or the like in a variety of ways for connection to drive or output elements, for example shafts with a solid or hollow cross-section. The first coupling part can preferably have a disk-like connecting flange, from which the projection with the peripheral groove rises. The second coupling part can preferably have a central hole, which opens into the recess, for accommodating and fixing, possibly, an (output) shaft in the case of a bell or cup-like overall design.

The invention also comprises a worm for a conveyor, preferably for a sampler, with the worm flight being fixed to a worm shaft that runs centrally in the longitudinal direction, and the worm shaft being connected to a coupling part of the coupling according to the invention, preferably to the second coupling part of said coupling. Furthermore, the invention comprises a sampler which comprises a worm conveyor that has a worm of the abovementioned type. In this respect, a worm of this type or a sampler of this type may also form the subject matter of independent claims.

BRIEF DESCRIPTION OF THE DRAWINGS

The invention will be explained in greater detail below with reference to the accompanying figures which show preferred exemplary embodiments of the invention, and in which:

FIG. 1 shows a longitudinal section through the coupling according to the invention, according to a preferred embodiment in the connected state;

FIG. 2 shows a section along section line II-II in FIG. 1,

FIG. 5 shows a further longitudinal section of the coupling shown in FIG. 1, at the beginning of the connection procedure;

FIG. 6 shows a further longitudinal section of the connecting procedure, at a later point in time;

DETAILED DESCRIPTION OF THE INVENTION

Figure 3:
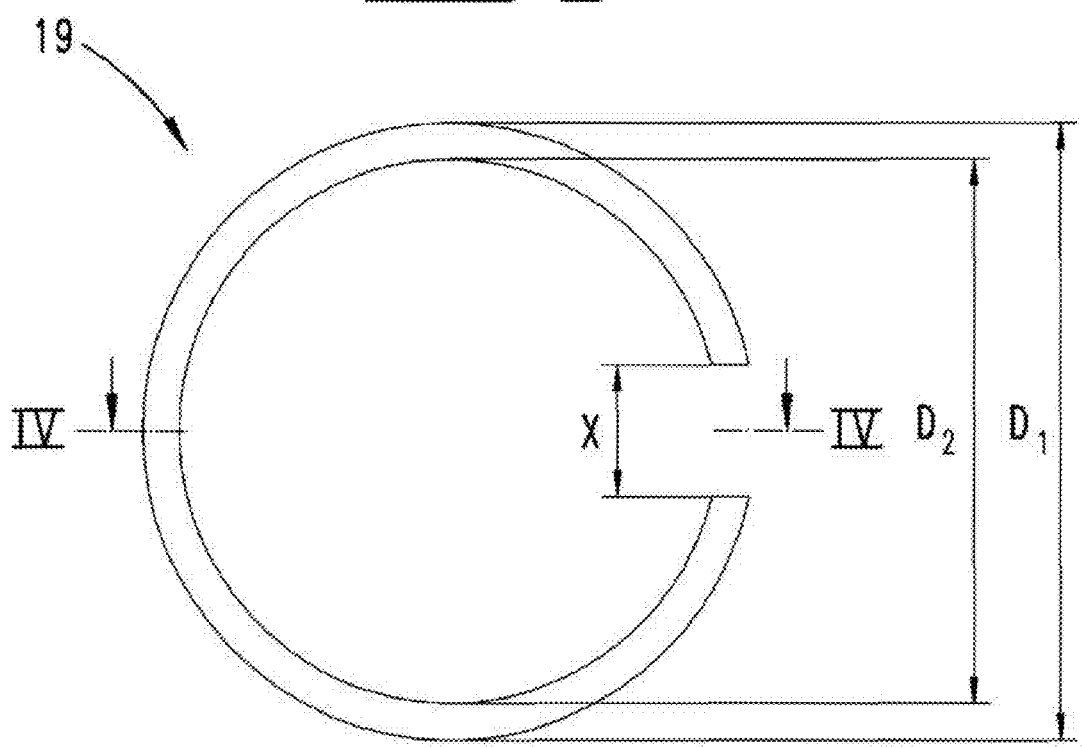
FIG. 3 shows a plan view of the locking member illustrated in FIG. 1.
Figure 4:
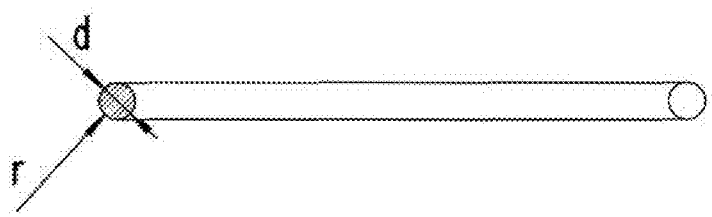
FIG. 4 shows a sectional view along section line IV-IV in FIG. 3.

FIG. 1 shows a longitudinal section of a preferred exemplary embodiment of the coupling 1 according to the invention, said longitudinal section running through the central geometric axis of rotation 2 of said coupling. The coupling 1 comprises a first coupling part 3 and a second coupling part 4, these coupling parts each being integrally formed. In this case, the first coupling part 3 has a shape which is formed from a plurality of disk segments, so that it could also be called a coupling disk. In contrast, the second coupling part has inner recesses that adjoin one another, the cross-sections of which are matched to the disk segments, so that this can be called a coupling bell overall. On the first coupling part 3, the disk segment 5 of largest diameter which is axially at the edge forms a connecting flange for connection to a matching mating flange of a drive or output element, preferably to a drive flange. To this end, two through holes 9, which are opposed and at the edge and through which screws 10 are brought in order to be screwed into the thread of the mating flange (cf. FIG. 10), are located at that edge 8 which projects beyond the adjoining disk segments 6, 7. In addition, a central through hole 9 is provided with a screw 10, the screw head of said screw being recessed into the disk segments 6, 7 of reduced diameter. For the purpose of connection to a drive or output element, preferably for connection to an output-side hollow shaft 11 which is illustrated by way of a detail of an end, the second coupling part 4 has a central through hole 12 which extends as far as said recesses. In the selected exemplary embodiment, the three disk segments 5, 6 and 7 each have a circular cross-section, with the diameter in each case being reduced from disk segment 5 to disk segment 6 and from there to disk segment 7. In this respect, the central disk segment 6 forms a projection 13 which extends in the direction of the geometric axis 2 from the connecting segment 5, with a first peripheral groove 15 with a semicircular cross-section (also see FIGS. 5 and 6) being let into in the cylindrical outer surface 14 of said projection 13. In the selected example, but not necessarily, the peripheral groove is a closed or continuous annular groove of circular shape on the periphery. The second coupling part 4 has a recess 16, the similarly round cross-section of which is adapted as a receptacle for the projection 13 with a clearance or transition fit and into the cylindrical lateral surface 17 of which a second peripheral groove 18 is made. In the selected example, but not necessarily, the peripheral groove is also here an annular groove which runs in a circular and closed manner on the periphery. In terms of their lateral surfaces 14, 17, the projection 13 and the recess 16 are disposed concentric with the center line 2. In the connected state shown in FIG. 1, the two coupling parts 3, 4 can be releasably connected in a resilient and latching manner by means of a locking member 19 which is inserted into the two peripheral grooves 15, 18 in the axial direction, that is to say in the direction of the axis of rotation 2. As illustrated in FIGS. 3, 4, the locking member is a spring-steel round-wire circlip which is open on the periphery. While the first peripheral groove 15 has a semicircular cross-sectional shape transverse to its peripheral direction (cf. FIG. 5), the second peripheral groove 18 has a rectangular cross-sectional shape, being virtually square in the selected exemplary embodiment. On its cross-section which is oriented transverse to the peripheral direction, the locking member 19 has a cross-sectional radius r which corresponds to the radius R of the rounded portion of the first peripheral groove 15. The width B of the second peripheral groove 18 in the axial direction is only slightly (and in the figures therefore not visibly) greater than the diameter d of the cross-section of the locking member 19. The function of this releasable axial coupling or locking device which is formed from the projection 13 with a peripheral groove 15, the recess 16 with a peripheral groove 18 and the locking member 19, will be discussed in even greater detail in the text which follows.

With reference to FIGS. 1 and 2, it is also clear that the first coupling part 3 has an eccentric projection 20 which is formed by the disk segment 7 of smallest diameter. As shown in FIG. 2, this eccentric projection extends with the eccentricity e parallel to and at a spacing from the axis of rotation 2 of the coupling. The second coupling part 4 has an eccentric recess 21, which is matched to the eccentric projection 20 with a clearance or transition fit, in order to accommodate the eccentric projection 20. The eccentric projection 20 extends starting from a tapered edge of the projection 13 that has the peripheral groove 15, and the eccentric recess 21 extends starting from the base of the concentric recess 16 that has the second peripheral groove 18. In this respect, the eccentric projection 20 and the eccentric recess 21 form a positively-locking, releasable torque transmission device.

The round-wire circlip shown in FIGS. 3, 4 has, in the unloaded state, an open periphery which follows a circular line. In the selected example, the width X of the peripheral opening is approximately ¼ of the inner ring diameter $D_2$.

Bringing in FIGS. 5 and 6, the functioning of the axial connection device and the establishment and release of the axial coupling connection will now be described in greater detail. FIG. 5 relates to a first state in which the two coupling parts 3, 4 are not yet locked in the axial direction. The locking member 19 is initially inserted into the peripheral groove 18 of the coupling part 4 such that it can still move. In this unloaded state of the locking member 19, the outside diameter $D_1$ of said locking member is less than the diameter $D_3$ of the second peripheral groove 18 at the groove base of said peripheral groove, but is greater than the diameter $D_4$ of recess 16, so that the result is captive accommodation, and the inner contour of the locking member 19 protrudes out of the peripheral groove 18 (at least by way of a portion of its periphery, depending on the exact position) radially inward into the recess 16. In order to connect the two coupling parts 3, 4, the projection 13 is initially inserted into the recess 16 as far as an axial depth which is somewhat less than that in FIG. 5, and the coupling parts 3, 4 are rotated in relation to one another until the eccentric projection 20 enters the eccentric recess 21. The position shown in FIG. 5 in which the conical tapered portion 22 of the projection 13 butts, by way of its edge or transition to the eccentric projection 20, against the round-wire circlip 19 is only reached as a result of the above action. In the selected example, the cone angle of the tapered portion 22 is, by way of example, 30°, but, in a deviation from this, other cone angles and/or rounded portions can be realized. The coupling part 3 can be pushed further into the coupling part 4 by applying an increased axial force. In the process, the tapered portion 22 widens the locking member 19 to such a degree that said locking member can move up onto on the lateral surface 14, cf. FIG. 6. Upon further insertion, the connection state in FIG. 1 is reached, in which the locking member 19 latches into the radially inner peripheral groove 15 on account of its spring action and radial prestress. In this connection state, the inside diameter $D_2$ of the locking member 19 corresponds to the diameter $D_5$ of the first peripheral groove 15 at the groove base of said peripheral groove, and the outside diameter $D_1$ of the locking member 19 is greater than the diameter $D_4$ of the recess 16. On account of the described size and diameter ratios, one half of the cross-sectional shape of the round-wire circlip 19 is situated in each of the annular grooves 15, 18 in the selected exemplary embodiment. Furthermore, in the unloaded state of the locking member 19 also, the inside diameter $D_2$ of said locking member 19 corresponds to the diameter $D_5$ of the first peripheral groove 15 at the groove base of said peripheral groove in the selected exemplary embodiment. Disconnection of the coupling parts 3, 4 is effected in analogous manner by reversing the relative displacement, an axial force of greater magnitude being required however for this purpose in the desired manner on account of the selected cross-sections of the annular grooves and of the round-wire circlip. FIG. 1 also shows that the axial position of the first and second peripheral grooves 15, 18 is selected or determined such that the projection 13 and the eccentric projection 20 virtually completely fill the associated recesses 16, 21 in the connection state shown, but with a small axial gap remaining at the end, and also at the flange 8, in order to avoid any problems.

Figure 7:
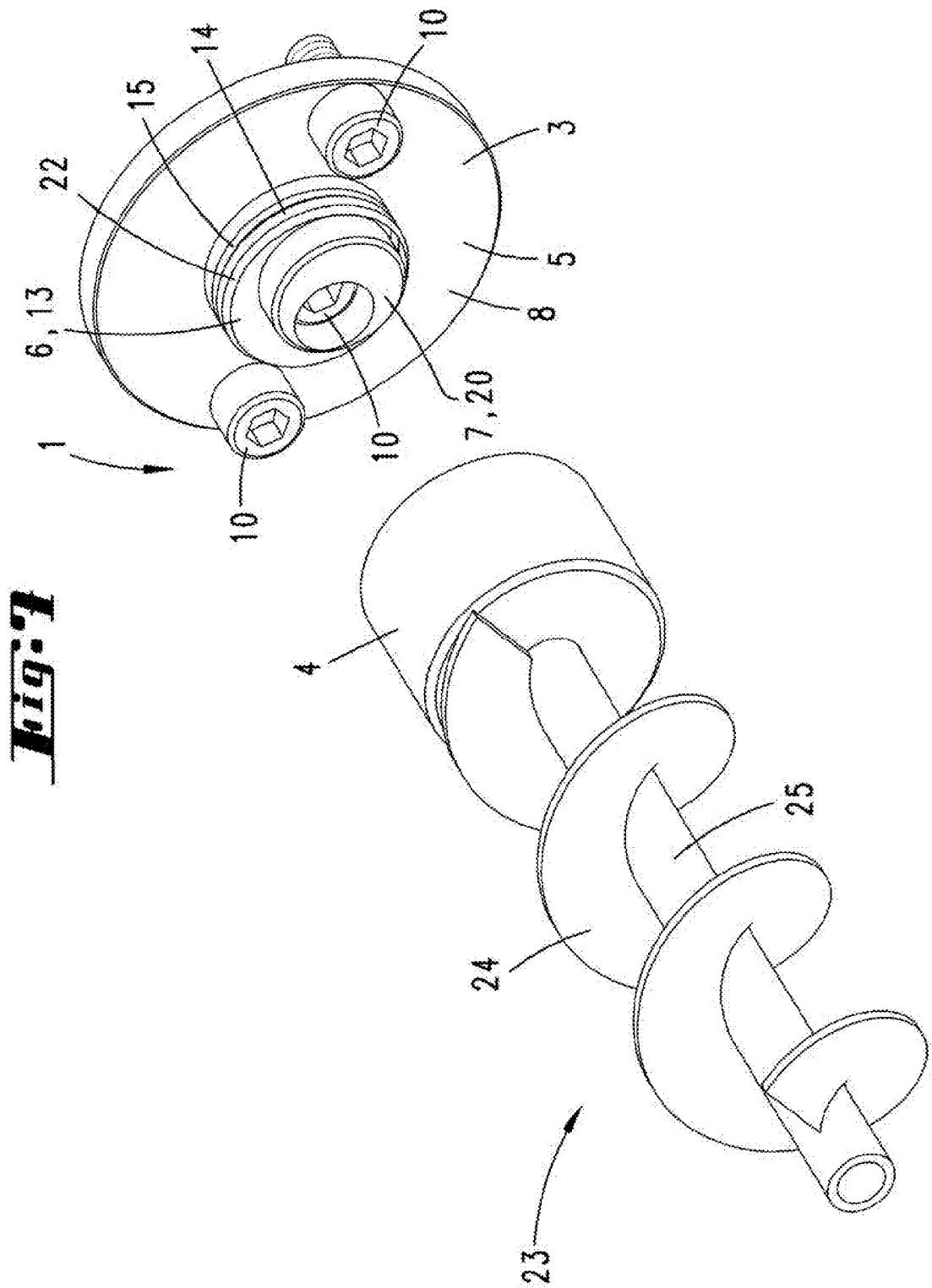
FIG. 7 shows a perspective view of the coupling according to FIGS. 1 to 6 in conjunction with a conveyor worm.
Figure 8:
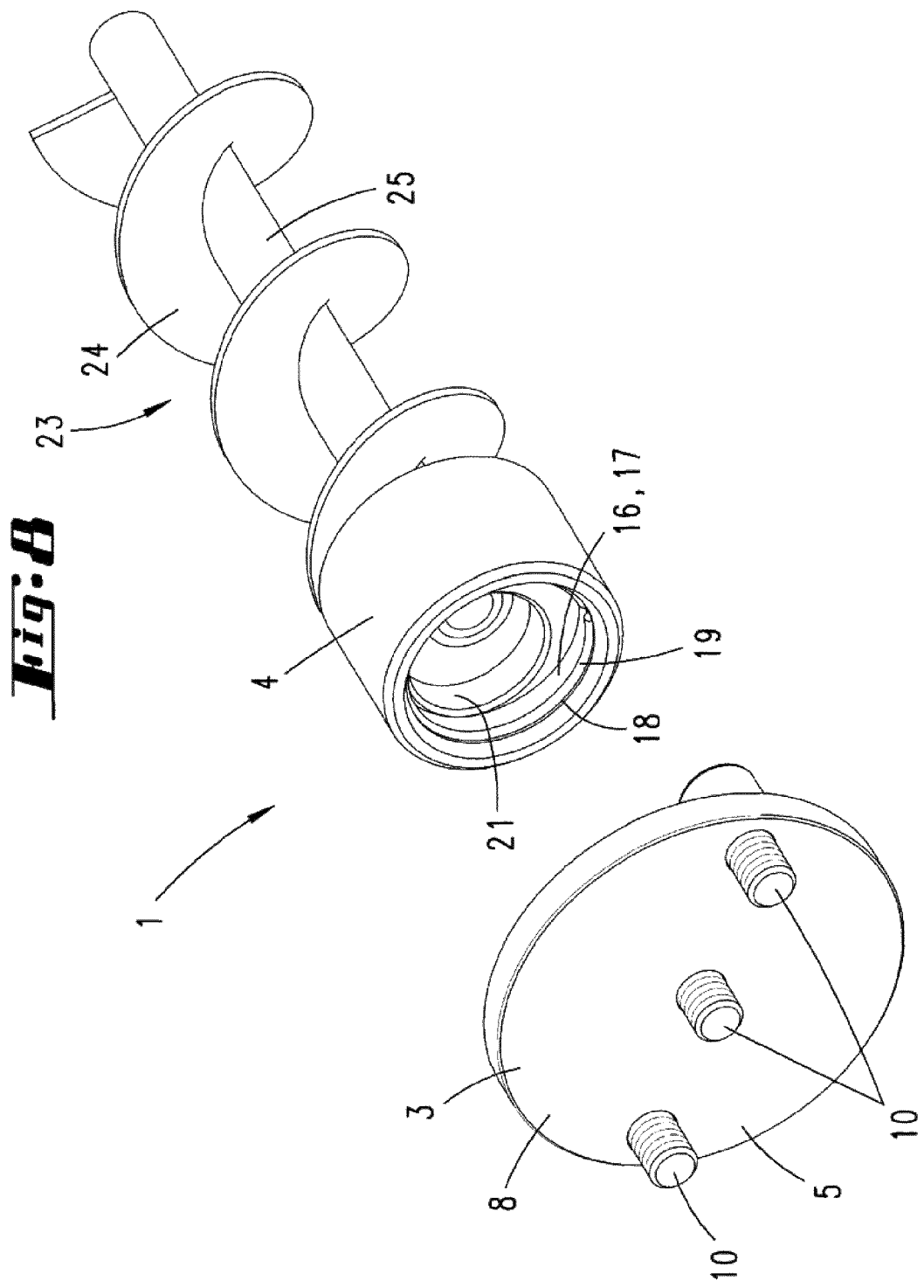
FIG. 8 shows the position from FIG. 7 from another viewing direction.
Figure 9:
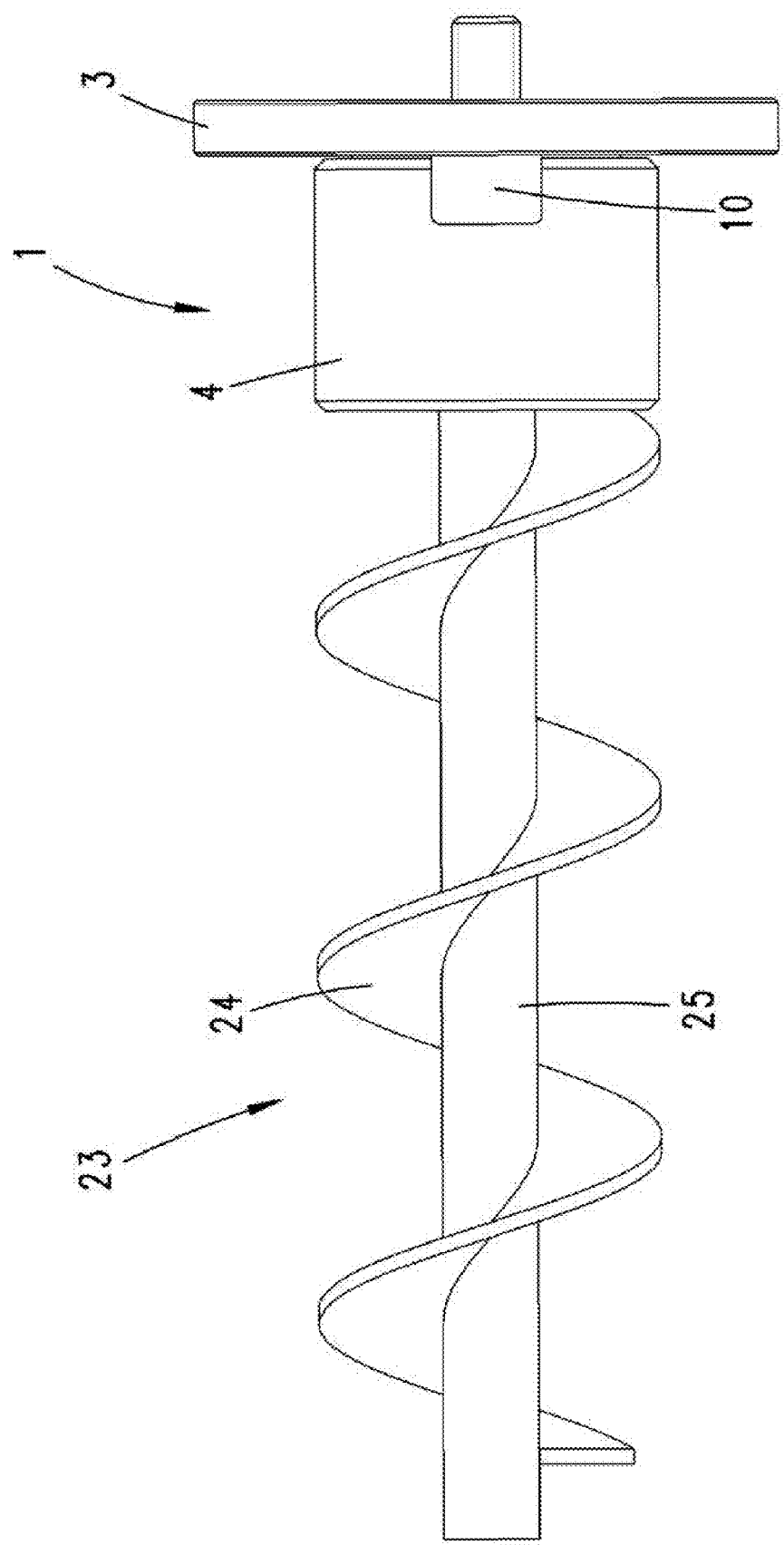
FIG. 9 shows a longitudinal section of the components shown in FIGS. 7, 8 in the connected state.

FIGS. 7 to 9 show the coupling 1 described with reference to the preceding figures in conjunction with a worm 23 which serves to convey, for example, bulk materials. The worm comprises a worm flight 24 which is fixed in a manner which is known per se on a central worm shaft 25 of hollow cross-section. At the drive end, the worm shaft 25 enters the hole 12 (cf. FIG. 1) of the second coupling part 4 and can be secured, for example welded, (in a manner which is not illustrated in greater detail) to the coupling part 4 in the axial direction and the peripheral or rotational direction. In this respect, the worm 23 is further developed, according to the invention, such that it is connected to the second coupling part 4 and to the coupling 1 according to the invention.

Figure 10:
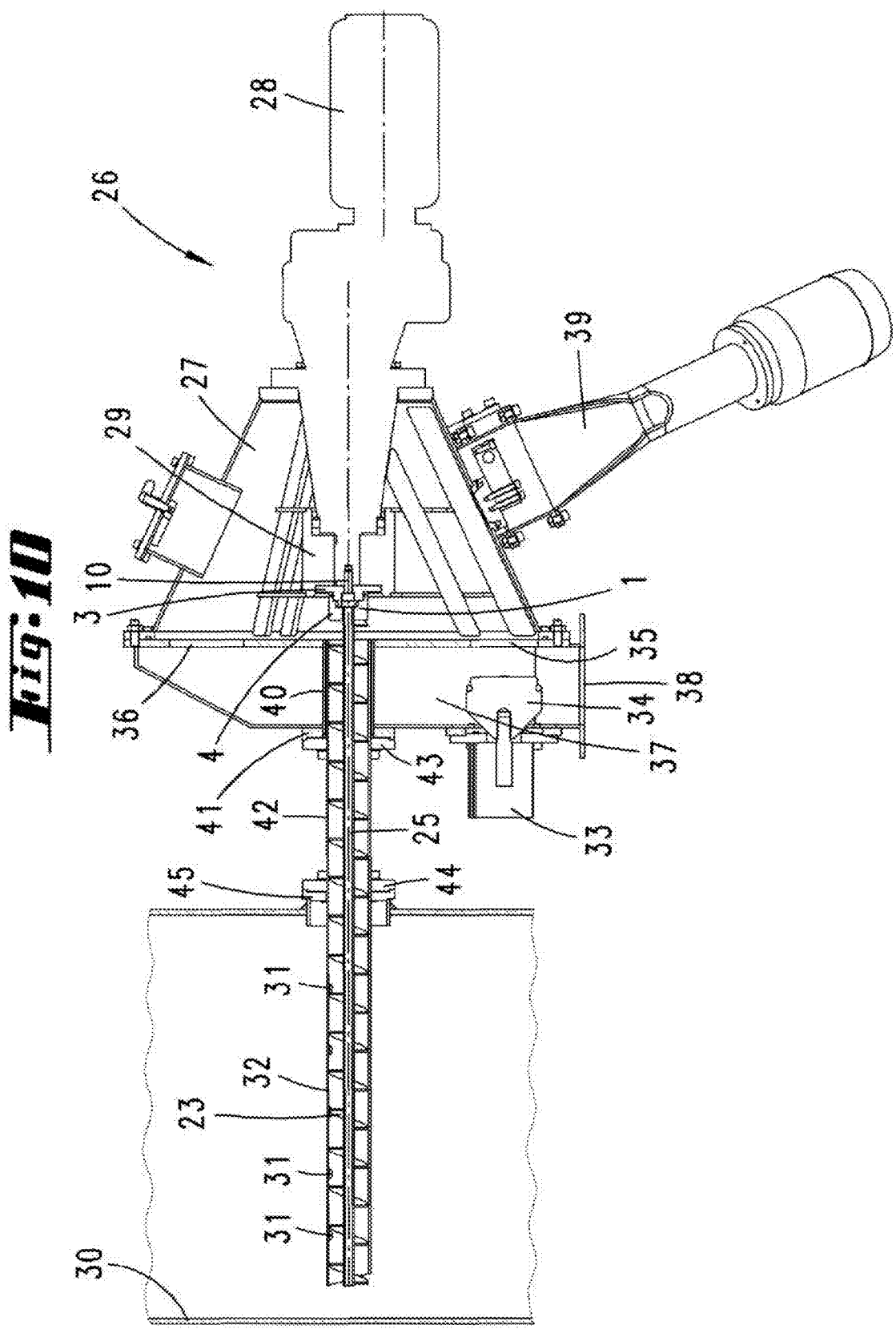
FIG. 10 shows a preferred application example of the coupling shown in FIGS. 1 to 6 in a sampler with a conveyor worm.

FIG. 10 shows, in a longitudinal section which is schematically simplified in part, a preferred application example, which lies within the scope of the invention, of the coupling or worm according to the invention which is described with reference to the preceding figures. The apparatus shown is what is known as a sampler, in which the worm 23 which is described with reference to FIGS. 7 to 9 serves to feed loose sample material, such as for example cement, to a mixer 27. A geared motor 28 drives a mixer agitator 29 and, via this, the worm shaft 25 by means of the axially interpositioned coupling 1 according to the invention. The sample material, for example cement, falls into a chute 30 (conveying with negative pressure) and passes through sample-capturing openings 31 into a casing pipe 32 and, in said casing pipe, into conveying spaces in the worm 23. The openings 31 may be, for example, round, elliptical, angular or in the shape of elongate slots and be axially parallel (or not) depending on the position. A cement sample is conveyed by the worm 23 in the casing pipe 32 into the mixer 27 by rotating the worm shaft 25. A pneumatic cylinder 33 closes a sample discharge 35 of the mixer 27 by way of the closure plunger 34. During sampling, the mixer agitator 29 thoroughly mixes the cement sample in the mixer 27. If the mixer 27 is over-filled, the sample material is conducted to the outlet 38 through the overflow 36 and the overflow channel 37. A sample can be taken from the mixer 27 either by means of the device for manual sampling 39 or through the sample discharge 35. The plug-type coupling 1 according to the invention allows the worm 23 to be coupled to and uncoupled from the mixer 27, and in particular also allows retrofitting of said worm to said mixer. In the selected exemplary embodiment, the second coupling part 4 (that is to say the coupling bell) is connected to the worm shaft 25 such that it cannot be released. The worm itself is welded to the worm shaft. For mounting or connecting purposes, the first coupling part 3 (or the coupling disk) on the mixer agitator 29 is located on the drive shaft of the geared motor 28, or is mounted there on a once-off basis. In the second coupling part 4, the round-wire circlip (locking member 19) is inserted into the peripheral groove 18 in said coupling part. The worm 23 is inserted, with the worm shaft 25 and the coupling bell 4, in the axial direction through a mixer flange 41 and the connection pipe 40 (guide pipe), and the second coupling part 4 is pushed onto the first coupling part 3 in a centering manner until the desired coupling connection is established in the manner described above. In this case, it is possible to sense the position of the eccentric projection 20 by rotating the worm 23 and then to bring the coupling 1 into latching engagement by gentle pressing, for example by striking the worm with a plastics hammer. The plug-type coupling 1 can be released again by pulling strongly on the worm 23. In the manner described, the worm can also be coupled to and uncoupled from the mixer, for example for cleaning purposes, any number of times in the described simple and space-saving manner, even though the drive-side shaft end is accessible only through the narrow connection pipe 40. The casing pipe 42 can be fixed to the mixer by way of a casing pipe flange 43 and the mixer flange can be firmly screwed to the guide pipe. A further casing pipe flange 44 is used to attach the casing pipe to a mating flange 45 which is screwed to the chute 30. This construction makes clear that the worm 23 can be coupled and uncoupled after removal of the chute 30 even with the casing pipe 42 fitted. On account of the worm conveying direction selected in FIG. 8, an axial force which is directed away from the coupling 1 acts on the worm 23 during operation. The locking device of the coupling 1 is provided in the above-described manner such that it can withstand the axial force during operation but on the other hand the coupling 1 can still be manually released.

All disclosed features are (in themselves) pertinent to the invention. The disclosure content of the associated/accompanying priority documents (copy of the prior application) is also hereby incorporated in full in the disclosure of the application, including for the purpose of incorporating features of these documents in claims of the present application.

The invention claimed is:

1. A sampler having a worm shaft, a geared motor and a mixer which comprises a mixer agitator that can be driven by means of the geared motor, characterized in that a releasable coupling for releasable coupling connection of the worm shaft and the mixer agitator is disposed between the mixer agitator and the worm shaft, the coupling having a first and a second coupling part with means for transmitting torque, provision being made for the first coupling part to have a projection which extends in the direction of the geometric axis of rotation and in the lateral surface of which a first peripheral groove is formed, for the second coupling part to have a recess, the cross-section of which is adapted as a receptacle for the projection and in the lateral surface of which a second peripheral groove is formed, and a ring-like locking member being provided, which is elastically deformable in terms of the contour of its periphery, said locking member insertable into a peripheral groove or selectively into one of the peripheral grooves when the two coupling parts are in the disconnected state, and the contour of said locking member protruding out of this peripheral groove when the two coupling parts are in the disconnected state.

2. The sampler according to claim 1, characterized in that the first coupling part on the mixer agitator is mounted on the drive shaft of the geared motor, and in that the second coupling part is non-releasably connected to the worm shaft.

3. The sampler according to claim 1, characterized in that the locking member of the releasable coupling is a circlip which is open on the periphery, said circlip being a round-wire circlip or a circlip with an oval, polygonal or angular cross-sectional shape, and in that one of the coupling parts has at least one eccentric projection which extends parallel to and at a spacing from the axis of rotation of the coupling, and the other coupling part has at least one eccentric recess for accommodating the eccentric projection.

4. The sampler according to claim 1, characterized in that the worm shaft, having a worm flight fixed to it, is rotatably disposed in a casing pipe with openings, the casing pipe being fixed to the mixer by a casing pipe flange.

5. The sampler according to claim 1, characterized in that the first coupling part has an eccentric projection, that the second coupling part has an eccentric recess for accommodating the eccentric projection, that the cross-sections of the eccentric projection and of the eccentric recess are matched to a common clearance fit or transition fit and that the cross-sections of the eccentric projection and of the eccentric recess are bounded in a circular manner, transverse to the axis of rotation of the coupling.

6. The sampler according to claim 1, characterized in that the locking member can be inserted into the second peripheral groove, and in that the inner contour of said locking member protrudes out of the second peripheral groove into the cross-section of the recess when the two coupling parts are in the released state, and engages in the first peripheral groove when the two coupling parts are in the connected state.

7. The sampler according to claim 1, characterized in that the cross-sections of the projection and of the recess are matched to a common clearance fit or transition fit and are bounded in a circular manner, in particular transverse to the geometric axis of rotation.

8. The sampler according to claim 1, characterized in that the first peripheral groove has, transverse to the peripheral direction, a cross-section which is one of rounded, a portion of a circle, and semicircle.

9. The sampler according to claim 1, characterized in that the second peripheral groove has, transverse to the peripheral direction, a cross-section which is one of rectangular and square cross-section, in particular with corners which are one of rounded and chamfered.

10. The sampler according to claim 8, characterized in that the locking member has, transverse to the peripheral direction, has cross-section a portion of which is rounded, the cross-sectional radius of which corresponds to the radius of the rounded portion of the first peripheral groove which is about the width of the second peripheral groove.

11. The sampler according to claim 1, characterized in that the cross-section of the projection has tapers at the edge of the projection which faces the base of the recess, which is one of conical and rounded.

12. The sampler according to claim 11, characterized in that the tapered portion extends as far as an edge cross-section which corresponds approximately to or is slightly smaller than the smallest cross-section of the projection which is left by the first peripheral groove.

13. The sampler according to claim 1, characterized in that when the two coupling parts are connected, the locking member has an inside diameter that corresponds to a diameter of the first peripheral groove at the groove base of said groove, and an outside diameter of the locking member is greater than a diameter of the recess.

14. The sampler according to claim 1, characterized in that, the projection extends from a connection end and is in the form of a disk with the lateral surface of the projection concentric with the geometric axis of rotation.

15. The sampler according to claim 12, characterized in that one of the coupling parts has at least one eccentric projection which extends parallel to and at a spacing from the axis of rotation of the coupling, and the other coupling part has at least one eccentric recess for accommodating the eccentric projection.

16. The sampler according to claim 15, characterized in that the eccentric projection extends from the tapered edge of the projection, and in that the eccentric recess extends starting from the base of the recess of the second peripheral groove.

17. The sampler according to claim 1, characterized in that a coupling part has at least one rotary positively-locking projection which extends, in particular, centrally with respect to the axis of rotation of the coupling and the cross-section of which deviates from a circular shape, and the other coupling part has at least one rotary positively-locking recess, the cross-section of which is matched to the cross-section of the rotary positively-locking projection as a rotary positively-locking socket.

18. The sampler according to claim 1, characterized in that the worm shaft runs centrally in the longitudinal direction, and in that the worm shaft is connected to the second coupling part.

\* \* \* \* \*